April 18, 1950

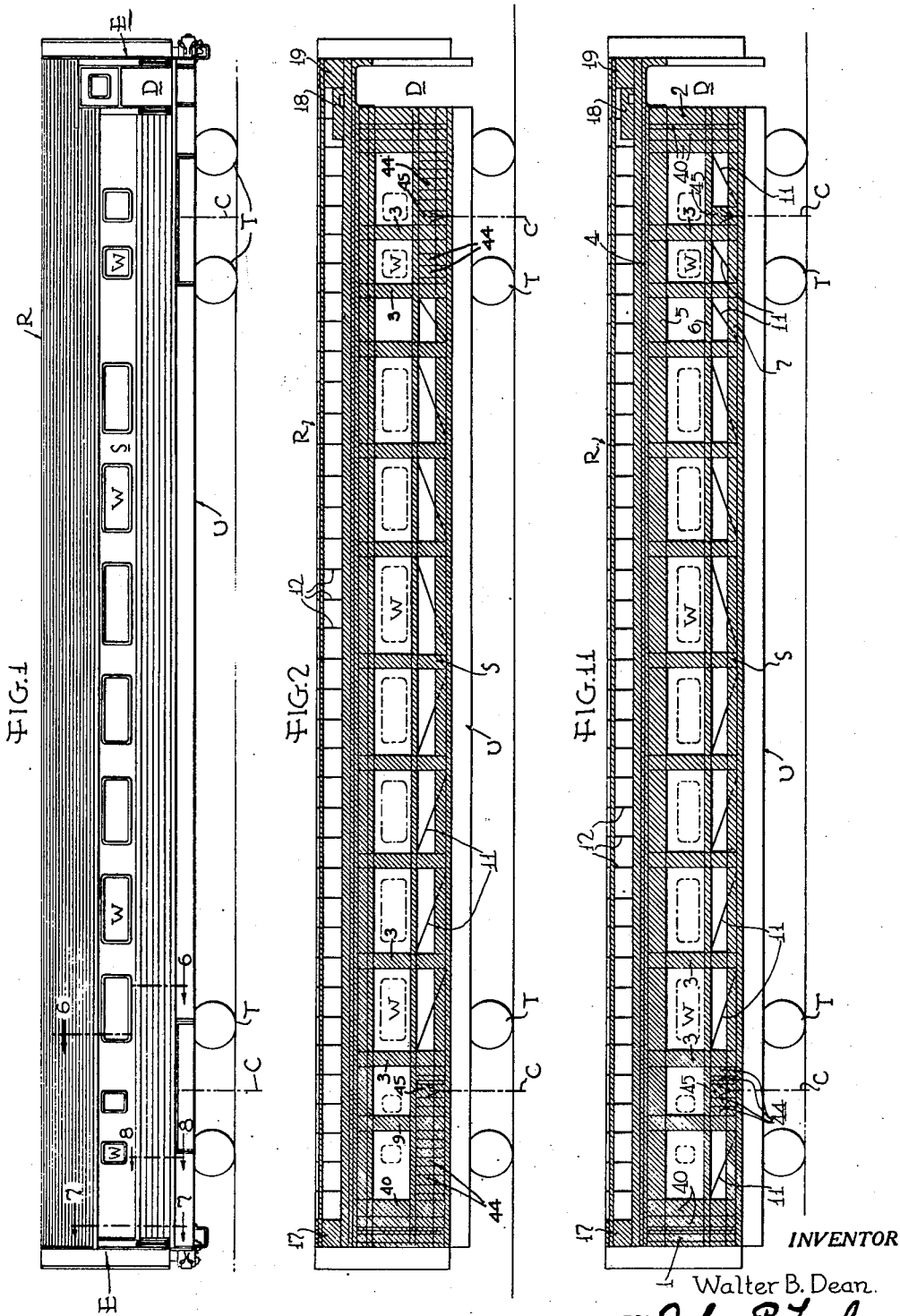

W. B. DEAN

BODY SIDE WALL FOR VEHICLES,
ESPECIALLY RAILWAY CARS 2,504,659

Filed March 31, 1945

INVENTOR
Walter B. Dean.
BY John P. Tarbot
ATTORNEY

April 18, 1950
W. B. DEAN
2,504,659
BODY SIDE WALL FOR VEHICLES, ESPECIALLY RAILWAY CARS
Filed March 31, 1945
3 Sheets-Sheet 3
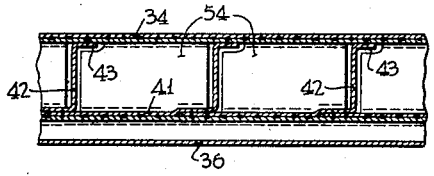
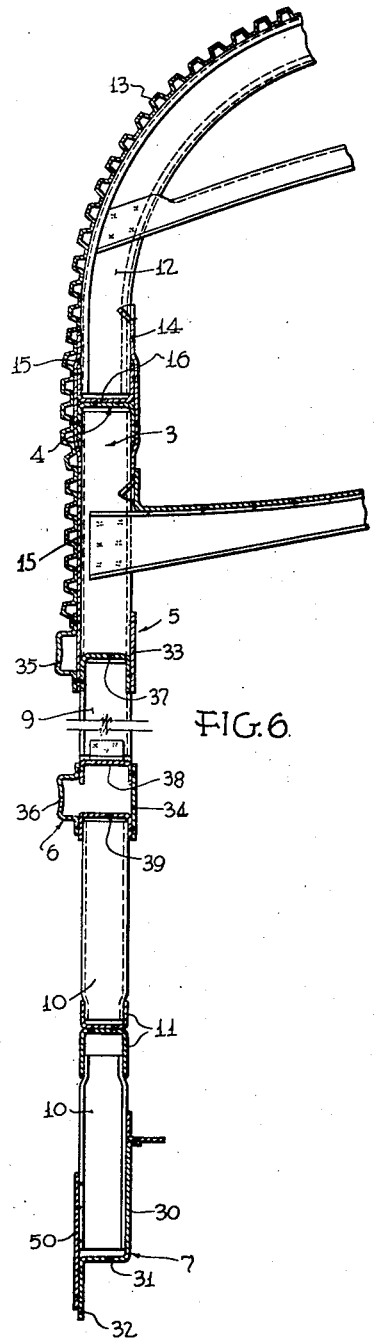
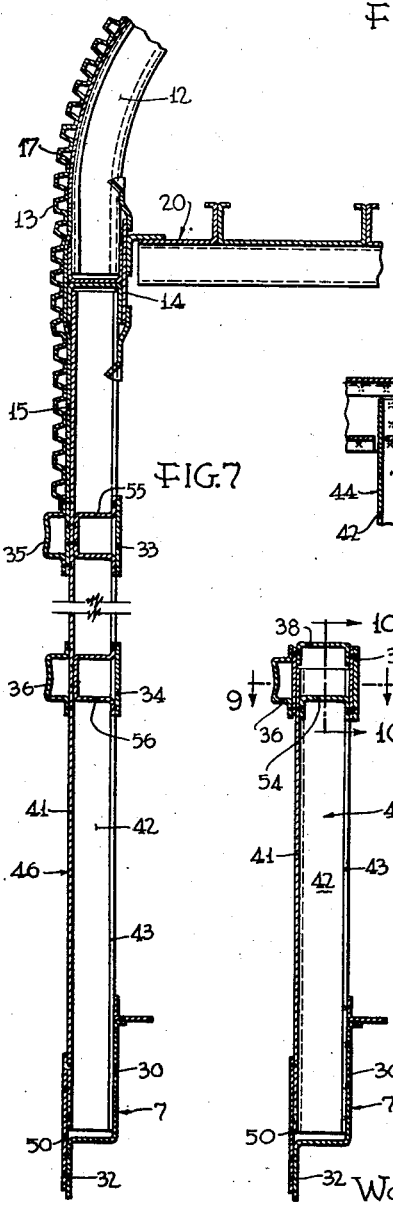
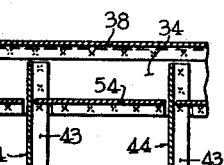
INVENTOR
Walter B. Dean.
BY John P. Tarbot
ATTORNEY Patented Apr. 18, 1950

2,504,659

UNITED STATES PATENT OFFICE 2,504,659

BODY SIDE WALL FOR VEHICLES, ESPECIALLY RAILWAY CARS

Walter B. Dean, Narberth, Pa., assignor to The Budd Company, Philadelphia, Pa., a corporation of Pennsylvania Application March 31, 1945, Serial No. 585,899

4 Claims. (Cl. 105—397)

The invention relates to body side walls for vehicles and particularly for railway cars as well as to the construction of vehicle bodies in general as far as it is affected by the side wall construction.

Among the objects of the invention is a side wall construction for vehicle bodies which is adapted for distributing the stresses from the suspension regions of the body into the remainder of the side wall and for transmitting at least part of the stresses from the side wall into adjoining portions of the roof.

A further object of the invention consists in a vehicle body which is adapted for the transmission of heavy longitudinal shocks and for the distribution of such shocks over wide regions of the walls, the roof and the underframe so as to avoid serious destruction.

An object of the invention consists also in a side wall which combines the achievement of the aforesaid objects and other advantages with light weight, simple construction and ease of manufacturing the same.

The aforesaid and other objects of the invention are mainly achieved by a side wall construction consisting largely of an open truss work composed of longitudinal chords, vertical posts and diagonals but which in the end regions and/or the regions of the support of the body on the wheels or trucks is provided with shear panels stiffened by vertically extending transverse webs.

The invention is especially useful in combination with, but by no means necessarily restricted to, vehicle body constructions incorporating simultaneously features of the two applications filed March 2, 1945, Serial No. 580,646, for "Body for vehicles, especially rail cars" of the same inventor and Serial No. 580,647, for "Body construction, especially for rail cars" of Raymond J. Theriault, as well as features of the two applications filed on March 31, 1945, simultaneously with the present application, for "Body, especially roof for vehicles such as railway cars" Serial No. 585,900, of the same inventor and "Reinforcing structure for vehicle bodies especially for railway cars," Serial No. 585,908, of Raymond J. Theriault.

The features of the invention and further objects and advantages thereof will be more easily and completely understood from the embodiments illustrated in the attached drawings and described hereinafter.

In the drawings:

Fig. 1 is a diagrammatic side elevation of a railway car;

Fig. 2 is a diagrammatic elevation of the same car showing the distribution and arrangement of main stress transmitting elements of side wall and roof;

Figure 3:
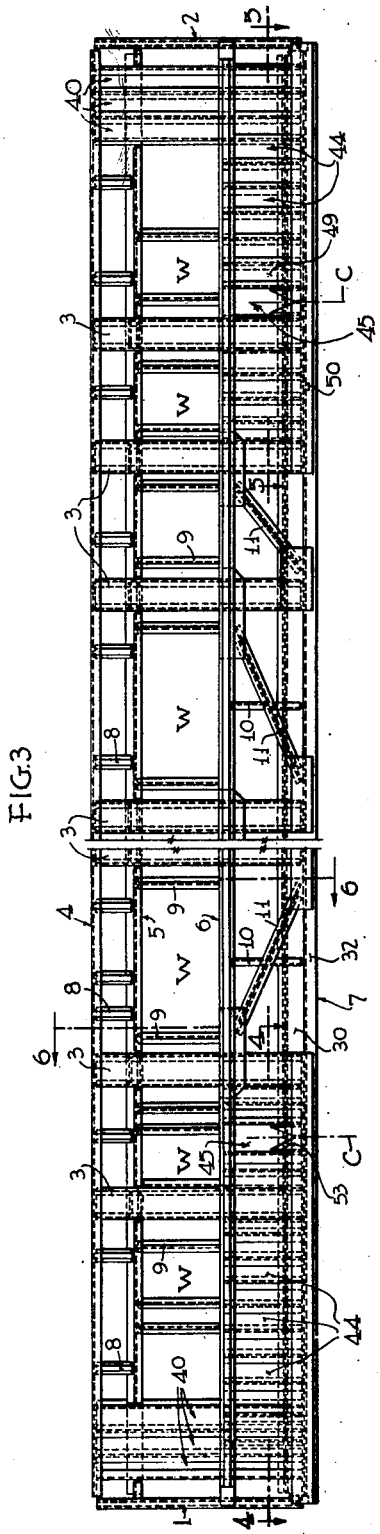
Fig. 3 is a fragmentary side elevation on a larger scale of the supporting framework of one body side wall.
Figure 4:
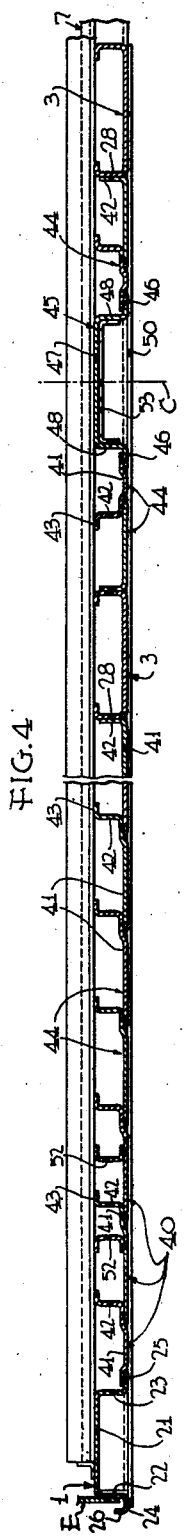
Figure 5:
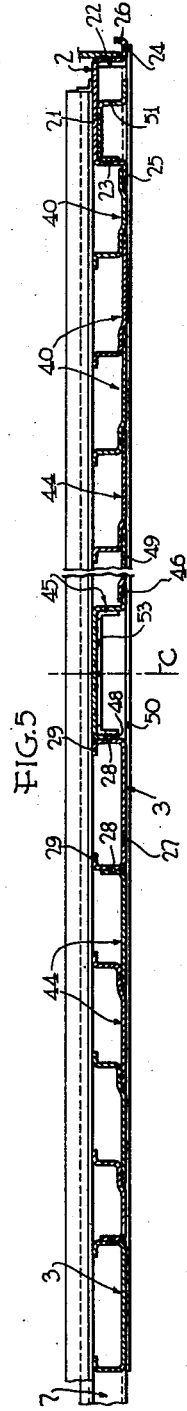

Figs. 4 and 5 are fragmentary sections through the lower end portions of the side wall framework substantially along lines 4—4 and 5—5 respectively, of Fig. 3, yet on a larger scale;

Figs. 6, 7 and 8 are fragmentary vertical sections through the side wall and adjoining roof and other body portions taken substantially along the correspondingly numbered lines of Fig. 1 on a scale still larger than Figs. 4 and 5;

Figs. 9 and 10 are fragmentary sections along lines 9—9 and 10—10 respectively, of Fig. 8; and Fig. 11 is a diagram similar to Fig. 2, yet showing a modified arrangement of the shear panels according to the invention.

The railway car body illustrated in the drawing comprises an underframe U; a pair of side walls S, one on each side; a roof R; and a pair of end walls E, one at each end. The body side walls S are provided with window openings W and near one end each with a door opening D. The body, which as a whole serves as stress transmitting and load supporting structure, is supported near its ends in vertical transverse planes indicated by the dot and dash lines C on trucks T of which the wheels only are diagrammatically illustrated in Figs. 1, 2 and 11.

Each side wall comprises vertical posts 1 at its non-vestibule end, a post 2 along the inboard margin of the door opening D and a plurality of posts 3 following and inboard of the end posts and between successive window openings. The posts are connected by four longitudinal chord structures 4, 5, 6 and 7 extending respectively along the upper margin of the side wall, along the upper and lower margins of the window openings and along the lower margin of the side wall. Vertical braces 8, 9 and 10 interconnect the chord structures between successive posts, and in the middle region of the wall the chord members 6 and 7 are furthermore interconnected by diagonal braces 11 which are also tied in with the adjoining posts 3 and the braces 10.

The roof has a plurality of transverse carlines 12 interconnected by the outer longitudinal corrugated sheathing 13 and additional longitudinal reinforcing plates or webs 14 and 15 as well as by marginal chord member 16, see Figures 2, 6, 7 and 11. All these longitudinal roof members are also tied into the upper portion of the side wall structures in a manner more fully disclosed and claimed in applicant's simultaneously filed application on "Body, especially roof for vehicles such as railway cars," Serial No. 585,900. In the end regions the roof is furthermore reinforced, see Figures 2, 7 and 11, by transversely extending panels or plates 17, 18 and 19 and at the vestibule end by an intermediate ceiling and shear panel structure 20, which reinforcements are more fully disclosed and form the subject matter of the just mentioned application and the simultaneously filed application on "Reinforcing structure for vehicle bodies, especially for railway cars," Serial No. 585,908, of Raymond J. Theriault.

The connection between the side walls and the adjoining portions of the underframe structure may be in accordance with the applications filed on March 2, 1945, on "Body for vehicles, especially rail cars," Serial No. 580,646 of the present inventor and on "Body construction, especially for rail cars" of Raymond J. Theriault, Serial No. 580,647.

The posts 1 and 2 are outwardly facing channel sections with a bottom wall 21, side walls 22, 23, marginal oppositely directed flanges 24, 25 and an inturned flange extension 26 on the flange 24. The posts 3 are inwardly facing channel sections having a bottom wall 27, side walls 28 and marginal flanges 29 turned toward each other. See Figures 4 and 5.

The upper and lower chord members 4 and 7 of each side wall extend uninterruptedly between and are connected to the end posts 1 and 2. The chord member 4 is a downwardly facing channel and the lower chord member is a Z-section member having an inner vertical arm 30, a horizontal web 31 and a lower outer arm 32. See Figures 6 to 8.

The intermediate chord members 5 and 6, see Figures 6 to 8, comprise each an inner strip or band 33 and 34 and an outer molding strip 35, 36, all of which extends over the entire length of the side wall. It will be noticed that the molding strip 35 belongs before final assembly to the roof unit. In addition, the chord structures 5 and 6 comprise short profiles inserted between successive posts and between the side walls thereof and bridging the space between the strips 33, 35 and 34, 36 respectively. Such profiles are shown at 37, 38 and 39 in Fig. 6. Near the ends of each side wall the chord structures 5 and 6 are supplemented by further short pieces between the longitudinal members 33, 35 and 34, 36, as will be described later on.

With the posts 1 and 2 at each end of the side walls are connected three angle section members 40, Figures 3 to 5 and 7, which extend over the full height of the body and end at the upper and lower chord members 4 and 7 respectively. These members have their one arm 41 arranged in the plane of the flanges 25 of the posts 1 or 2 and overlappingly connected to said flange and to each other, respectively, as clearly shown in Figs. 4 and 5. The other arm 42 of the members 40 extends toward the center of the car and is provided with a flange 43 arranged in about the plane of the bottom walls 21 of the posts 1 or 2.

Vertical members 44 of about the same cross sectional shape as the members 40 extend between and are connected to the chord members 6 and 7. The bottom walls 41 of the members 44 are connected, in the same manner as described hereinbefore for the members 40, with each other and with the last inboard member 40. The members 44 adjacent the posts 3 are free of the marginal flange 43 and have their inwardly extending arm 42 connected to the side wall 28 of the respective post.

At the location C of the truck suspension near the non-vestibule end of the car, an outwardly facing channel section member 45 has its marginal flanges 46 overlappingly connected to adjacent arms 41 of members 44, whereas the bottom wall 47 of the members 45 are arranged substantially in the plane of the flanges 43—see Figure 4. A similar member 45 is arranged at the location C near the vestibule end and has its inboard side wall 46, which is free of a marginal flange, overlapingly connected to the side wall 28 of a post 3 whereas its marginal flange 46 on the other side wall is connected by a plate 47 to the next member 44—see Figure 5.

The lower ends of the posts 1, 2, 3 and of the members 40, 44 and 45 are secured by the bottom walls, inner arms or flanges 21, 29, 43 and 47 to the arm 30 of the chord structure 7 whereas their outer flanges, bottom walls and arms 24, 25, 27, 41 and 46 and the plate 49 are connected by a longitudinal web or band 50 to the outer arm 32 of the member 7 see Figures 3 to 8. At points of great stress concentration, such as in the attachment regions for jacking pads, additional reinforcements in the form of braces 51 and 52, Figures 4 and 5, are secured respectively in the interior of post 2 and of some of the members 40 and are tied into the chord structures 6 and 7. The members 45 at the location of the bolsters (not shown), that is in the truck suspension regions C, have their lower ends reinforced by gussets 53, see Figures 3 to 5.

At the level of the chord structures 5 and 6, short bridging members 54, 55 and 56, shown in Figures 7 to 10, extend between successive transverse arms or walls 22, 23, 42, 48 and 28 of the posts 1, 2 and 3 and of the members 40, 44, 45. These bridging members have their longitudinal walls, flanges or arms secured to the longitudinal walls, arms and flanges of the shear panel and to the longitudinal webs and moldings 15, 33, 35, 34 and 36 respectively.

The posts 1, 2 and 3 in the end regions and the members 40, 44 and 45 form together shear panels which are strongly reinforced by their transverse walls and marginal flanges. These shear panels are adapted for the distribution of the stresses originating at the truck suspensions C over a wide area of the side wall and, through members and posts of the shear panel extending to the upper margin of the side wall, into the upper chord structure and in the roof. On the other hand, stresses exerted on the end walls E are distributed by means of the shear panels into the side walls directly or by way of the upper end portions of the roof. The areas covered by said shear panels and by other adjoining structures reinforced by the chords, the posts and by the roof and side wall connections are diagrammatically indicated in Fig. 2 by shading.

The embodiment illustrated in Fig. 11 differs from the embodiment shown in Figures 2 to 10 in that the extent of the shear panels is reduced in the interest of weight saving. In Fig. 11, full-height shear panels only are provided at the ends of the side walls and are formed by the end posts 1 and 2 and by the members 40. Short additional shear panels, which are separated from the end shear panels, are provided at the truck supports C. These additional panels extend on the non-vestibule end of the car between and include the last two posts 3 and are formed on the vestibule end by the last post 3 and the member 45 on each side of the body. The region not occupied in Fig. 11 by shear panels similar to the embodiment of Fig. 2, are supplied with additional diagonals 11.

The illustrated construction is especially adapted for the manufacture of sheet metal and for the joinder of the parts by electric spot welding. More specifically, the construction is designed, but not restricted to, the manufacture of high tensile sheet material such as cold-worked stainless steel.

The invention is not restricted to the illustrated embodiments but is susceptible to modifications and adaptations to meet specific conditions, manufacturing facilities, etc.

What is claimed is:

1. In a railway car body comprising stress transmitting side walls and a roof, which side walls consist largely of an open framework, shear panels extending between the lower and upper margins of the side walls in the regions of the truck supports and structurally connected with the adjacent parts of the walls so as to effectively distribute the stresses from the supports over a wide area of the side walls and thence into the roof.

2. In a vehicle body comprising side walls constituted mainly as skeleton girders but provided with wide shear panels substantially free of interruptions and extending in the end regions of the body over the entire height of the side walls in combination with longitudinal reinforcements interconnecting the shear panels at both ends and arranged in the connecting region of the side walls with the roof.

3. In a body for vehicles such as railway cars, side walls constituting main load supporting and stress transmitting elements and provided with a plurality of window openings, longitudinal chord structures along the upper and lower margins of each side wall, vertical posts between the window openings and also at the ends of each side wall, shear panels between and structurally connected with consecutive posts in the end regions of the body, which end regions are free of diagonals, said shear panels extending in part between the upper and lower marginal chord structures and in part from the lower chord structures to the lower margin of a window opening and structurally connected with said chord structures, the middle portion of each side wall consisting mainly of an open framework formed by said chord structures and posts and by diagonal braces.

4. In a side wall for railway car bodies and the like, longitudinal chord structures, longitudinally spaced vertical posts of channel section each having its bottom wall arranged in a vertical longitudinal plane and its side walls in vertical transverse planes, vertical angle section members arranged side by side between consecutive posts with one of their arms arranged in the longitudinal direction of the wall and overlappingly secured to the corresponding arms of the adjoining members thereby forming a panel in a vertical longitudinal plane, the other arms of said members extending in vertical transverse planes, some of the last named arms overlapping and being secured to side walls of the posts whereby said posts and said members constitute together a stress transmitting shear panel.

WALTER B. DEAN.

REFERENCES CITED

The following references are of record in the file of this patent:

UNITED STATES PATENTS

| Number | Name | Date |
| --- | --- | --- |
| 384,225 | Zurcher | June 5, 1888 |
| 972,467 | McKeen | Oct. 11, 1910 |
| 1,900,711 | Howard | Mar. 7, 1933 |
| 2,185,977 | Dean | Jan. 2, 1940 |
| 2,216,025 | Sheppard | Sept. 24, 1940 |
| 2,294,357 | Dean et al. | Aug. 25, 1942 |